United States Patent
Zhao

(10) Patent No.: US 12,482,337 B2
(45) Date of Patent: *Nov. 25, 2025

(54) METHOD FOR ASSEMBLING AN RFID COMPONENT TO A LOCATOR IN A CABLE LOCK

(71) Applicant: Shenzhen Wins Electronic Technology Co., Ltd., Shenzhen (CN)

(72) Inventor: Shengfei Zhao, Shenzhen (CN)

(73) Assignee: Shenzhen Wins Electronic Technology Co., Ltd., Shenzhen (CN)

( * ) Notice: Subject to any disclaimer, the term of this patent is extended or adjusted under 35 U.S.C. 154(b) by 67 days.

This patent is subject to a terminal disclaimer.

(21) Appl. No.: 18/243,285

(22) Filed: Sep. 7, 2023

(65) Prior Publication Data

US 2024/0371244 A1 Nov. 7, 2024

(30) Foreign Application Priority Data

May 4, 2023 (CN) .......................... 202310492000.7

(51) Int. Cl.
*G08B 13/14* (2006.01)
*G06K 19/07* (2006.01)

(52) U.S. Cl.
CPC ..... *G08B 13/1463* (2013.01); *G06K 19/0723* (2013.01)

(58) Field of Classification Search
CPC .......................... G08B 13/1463; G06K 19/0723
See application file for complete search history.

(56) References Cited

U.S. PATENT DOCUMENTS

| | | | | |
|---|---|---|---|---|
| 7,227,467 | B2 * | 6/2007 | Feibelman | G09F 3/0364 340/568.1 |
| 9,070,231 | B1 * | 6/2015 | Meyers | G06F 21/32 |
| 9,177,491 | B2 * | 11/2015 | Azzalin | G09F 3/0358 |
| 9,281,603 | B2 * | 3/2016 | Cullins | G09F 3/0295 |
| 9,745,782 | B2 * | 8/2017 | Mubarak | G08B 13/126 |
| 10,480,216 | B2 * | 11/2019 | Lim | G01S 19/13 |
| 11,107,335 | B2 * | 8/2021 | Lamontagne | G08B 21/0277 |
| 11,773,626 | B2 * | 10/2023 | Bullard | E05B 67/003 70/51 |
| 2008/0036596 | A1 * | 2/2008 | Auerbach | G09F 3/0329 340/542 |
| 2013/0049964 | A1 * | 2/2013 | Lee | G09F 3/0335 340/572.1 |

(Continued)

FOREIGN PATENT DOCUMENTS

CN 102923415 A 2/2013

*Primary Examiner* — Nay Tun
(74) *Attorney, Agent, or Firm* — Birchwood IP

(57) ABSTRACT

A method for assembling an RFID component to a locator in a cable lock includes connecting a disposable RFID component to a reusable locator by a detachable structure to form a complete cable lock. The method provides beneficial effects that the locator can be recycled for use in assembling new cable locks in spite of discarding the RFID component since the disposable RFID component and the reusable locator are divided in a traditionally integrated body of the lock. Furthermore, a container locked by the lock has location function due to the locator in the lock. Based on this, the recycling and reutilization of the locator are performed to achieve the location function in low cost situation.

16 Claims, 11 Drawing Sheets

(56) References Cited

U.S. PATENT DOCUMENTS

| | | | | |
|---|---|---|---|---|
| 2015/0337564 A1* | 11/2015 | Mubarak | ............... | G08B 21/18 |
| | | | | 70/20 |
| 2016/0135431 A1* | 5/2016 | Sheldon | ............... | A01K 27/009 |
| | | | | 119/859 |
| 2019/0047646 A1* | 2/2019 | Mohamed | ............... | B62H 5/003 |
| 2019/0080631 A1* | 3/2019 | Grapsa | ................ | G09F 3/0352 |
| 2020/0226954 A1* | 7/2020 | Sengstaken, Jr. | ....... | E05B 39/00 |
| 2021/0209912 A1* | 7/2021 | Claeys | ............... | G08B 13/2434 |
| 2023/0258026 A1* | 8/2023 | Bullard | ................ | G09F 3/0329 |
| | | | | 70/51 |

* cited by examiner

METHOD FOR ASSEMBLING AN RFID COMPONENT TO A LOCATOR IN A CABLE LOCK

CROSS-REFERENCE TO RELATED APPLICATIONS

This is a U.S. patent application which claims the priority and benefit of Chinese Patent Application Number 202310492000.7, filed on May 4, 2023, the disclosure of which is incorporated herein by reference in its entirety.

TECHNICAL FIELD

The present application relates to a cable lock, in particular to a method for assembling an RFID component to a locator in the cable lock.

BACKGROUND

Cable locks are mainly used for locking containers. At present, there exist two types of cable locks. With one type of cable lock, one can check whether the metal cable had been cut only by naked eyes. With the other type of cable lock, one can check whether the cable lock had been unlocked by the uploaded data through Radio Frequency Identification (RFID)) tags after the metal cable had been cut.

The above two types of cable locks do not have real-time locating and real-time signal sending functions. The specific function of the electronic cable lock and its usage under specified scenes cannot be realized.

The inventor finds that there are no commercially available products that can meet the above requirements. In addition, according to the inventor's search and analysis of the prior art, only some introductions of technologies with real-time locating and status-sending devices are found, such as the patent publication No. CN102923415A, entitled "Container door multi-frequency safety electronic label seal and monitor method thereof" filed by the applicant "Sheng Jun" on Nov. 12, 2012.

However, the patent publication is aimed at the multi-frequency security electronic signature seal of the door, which is mainly composed of a signature seal body and a U-shaped metal lock rod, not used in a cable lock, and the communication module of its Global Positioning System (GPS) module is integrally arranged on the electronic signature seal, thus the production and use cost is too high to be implemented as a specific product.

In the practical use scenario, each container needs a cable lock, so the demand for cable locks in logistics and transportation is huge, which poses huge demand for cable locks. Therefore, it is important to realize the locating function in the cable locks without significantly increasing the cost in the industry, in view of the huge demand for the cable locks.

SUMMARY

In order to at least alleviate the related problems in the prior art, in a disclosure of the present application a method for assembling an RFID component to a locator in the cable lock is provided.

In an embodiment of the disclosure, the method for assembling an RFID component to a locator in a cable lock includes connecting a disposable RFID component to a reusable locator by a detachable structure.

In an embodiment of the disclosure, the method includes removing the locator from a unlocking cable lock with a RFID component damaged, discarding the RFID component, and connecting the locator to a new RFID component by the detachable structure.

In an embodiment of the disclosure, the method includes connecting the RFID component to the locator by a T-shaped docking structure.

In an embodiment of the disclosure, the method includes providing an electric connection between the RFID component and the locator by a connector upon connecting the RFID component to the locator by a detachable structure.

In an embodiment of the disclosure, the method includes providing an electric connection between the RFID component and the locator by a pogo pin interface and an electrically conductive sheet upon connecting the RFID component to the locator by a detachable structure.

In an embodiment of the disclosure, the method includes limiting the RFID component and the locator by a position limit step upon connecting the RFID component to the locator by a detachable structure.

In an embodiment of the disclosure, the method includes threading a metal cable of the cable lock though the RFID component and the locator successively after connecting the RFID component to the locator by a detachable structure.

In an embodiment of the disclosure, the method includes triggering a power microswitch in the RFID component by the metal cable passing though the locator.

In an embodiment of the disclosure, the method includes threading the metal cable though a lock core in the locator in a single direction and locking the metal cable by the lock core in an opposite direction.

In an embodiment of the disclosure, the cable lock is unlocked as the metal cable is cut after the metal cable is locked by the lock core in the opposite direction, and the RFID component is damaged.

In an embodiment of the disclosure, the metal cable is a steel cable.

In an embodiment of the disclosure, the RFID component comprise an RFID device and an RFID side lock body, and wherein the RFID side lock body is a portion of the complete body of the cable lock.

In an embodiment of the disclosure, the RFID side lock body is provided with a docking structure which is a portion of the detachable structure.

In an embodiment of the disclosure, the RFID side lock body is provided with a RFID side connector.

In an embodiment of the disclosure, the locator includes a location device, a data transmitter and a location side lock body, and wherein the location side lock body is a portion of the complete body of the cable lock.

In an embodiment of the disclosure, the location side lock body is provided with a location side detachable portion which is a portion of the detachable structure.

In an embodiment of the disclosure, the location side lock body is provided with a location side connector.

In an embodiment of the disclosure, the location device is electrically connected to the data transmitter.

In an embodiment of the disclosure, after unlocking, the RFID component is damaged and discarded, and the locator is removed and connected to a new RFID component by the detachable structure to form a new and complete cable lock. The steps of connecting the locator to the new RFID component by the detachable structure includes: connecting the new RFID component to the locator by a T-shaped docking structure; providing an electric connection between the new RFID component and the locator by a connector upon connecting the new RFID component and the locator; providing an electric connection between the new RFID component and the locator by a pogo pin interface and an electrically conductive sheet upon connecting; limiting the new RFID component and the locator by a position limit step upon connecting; threading a metal cable of the cable lock though the new RFID component and the locator successively after connecting the new RFID component to the locator; triggering a power microswitch in the new RFID component by the metal cable passing though the locator; and threading the metal cable though a lock core in the locator in a single direction and locking the metal cable by the lock core in an opposite direction.

There are following beneficial effects in the disclosure. According to the above embodiments, the traditional one-piece lock body is divided into two parts, i.e., a disposable RFID component and a recyclable locator. After unlocking, the RFID component is discarded and the locator is recycled for subsequent assembling for a new cable lock with locator. The locating function of the cable lock can be realized due to the locator, so as to realize the real-time locating function of the locked container. On this basis, the locator can be recycled, which can realize the locating function with increasing the use cost as less as possible, through reducing the amount of the locators, which means reducing the waste of the locator. As such, the generation of electronic waste is reduced. With the locating function achieved and cost controlled, environmental protection is also achieved, and the needs of wider use scenarios are met.

DETAILED DESCRIPTION

Figure 1:
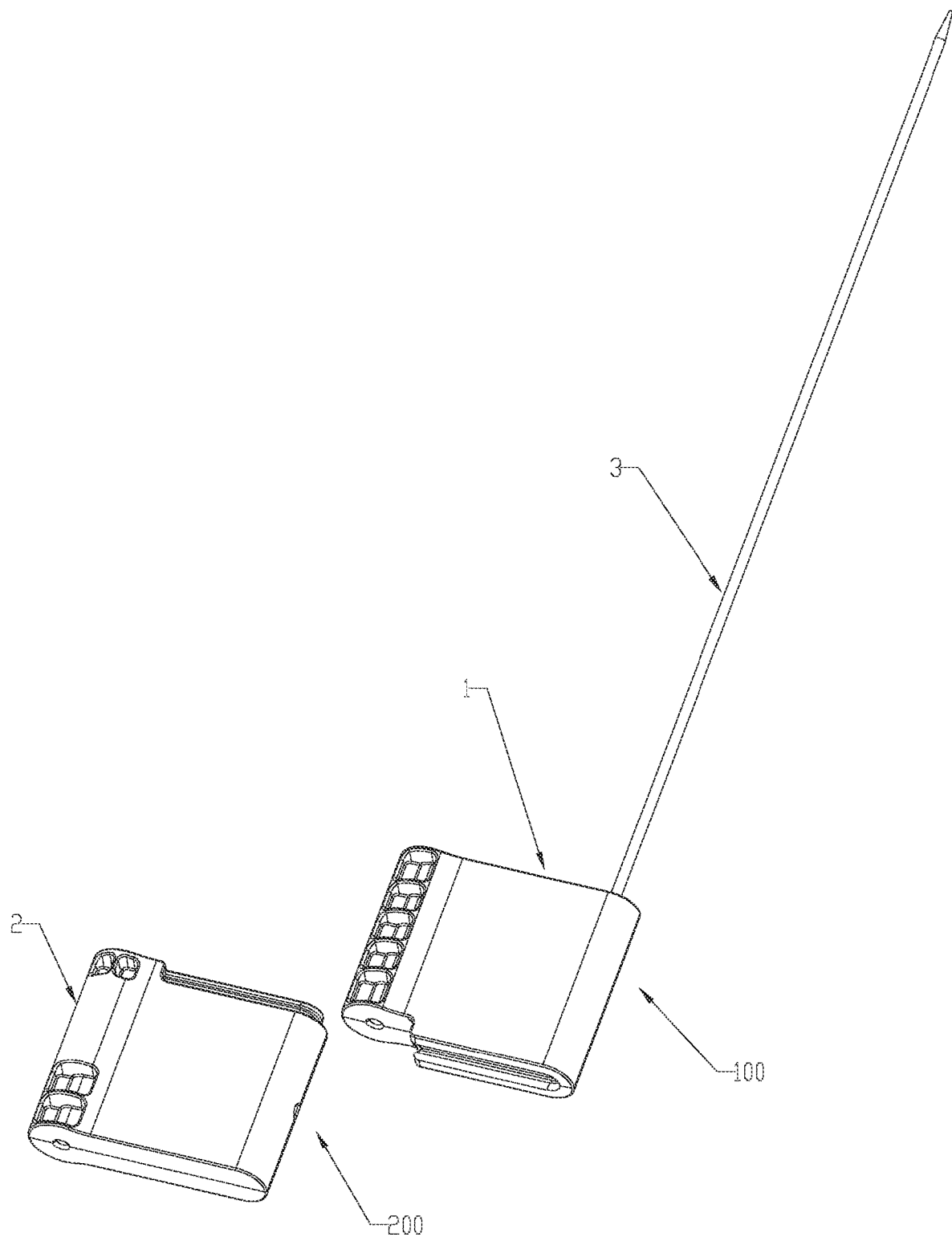
FIG. 1 depicts an exploded schematic view showing assembling an RFID component to a locator in a cable lock according to an embodiment of the disclosure.

It should be noted that the embodiments of the disclosure and the features in the embodiments may be freely combined with each other without conflict.

In the description of the disclosure, it should be understood that the terms "center", "longitudinal", "lateral", "up", "down", "front", "rear", "left", "right", "vertical", "horizontal", "top", "bottom", "inside", "outside", etc. indicate the orientation or position relationship based on the orientation or position relationship shown in the drawings, and are only for the convenience of describing the disclosure and simplifying the description, rather than indicating or implying that the device or component referred to must have a specific orientation, be constructed and operated in a specific orientation. And thus, those term shall not be understood as a limitation on the scope of protection of the disclosure. In addition, the terms "first" and "second" are only illustrative, and it is not intended to be interpreted as indicating or implying relative importance or implicitly indicating the number of indicated technical features. Thus, the features defined as "first", "second" and so on may explicitly or implicitly include one or more of the features referred to. In the description of the disclosure, unless otherwise specified, "plurality" means two or more.

In the description of the disclosure, it should be noted that unless otherwise specified and limited, the terms "mount", "connected" and "connection" should be broadly understood. For example, the connection can be a fixed connection, a detachable connection, or an integrated connection. And the connection can be a direct connection, can also be an indirect connection through an intermediate media, and can be a connection inside two elements. The specific meanings of the above terms in the disclosure can be understood through specific situations, by those having ordinary skills in the art.

The disclosure will be further illustrated in conjunction with the attached drawings and specific embodiments.

Embodiment One

Figure 3:
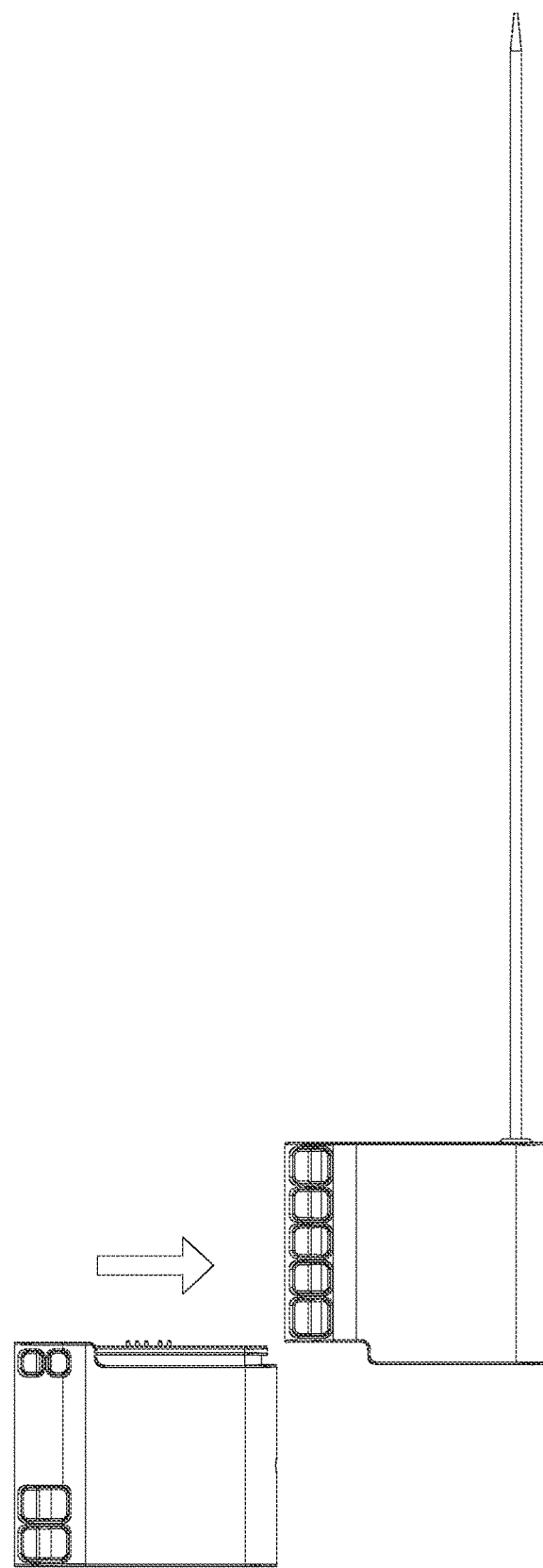
FIG. 3 depicts a schematic diagram showing the assembling process of a cable lock according to an embodiment of the disclosure.

As shown in FIGS. 1 and 3, a method for assembling an RFID component to a locator in a cable lock includes connecting a disposable RFID component 100 to a reusable locator 200 by a detachable structure, so as to form a complete cable lock.

After the cable lock is unlocked, the RFID component 100 is damaged and discarded, and the locator 200 is removed and connected to a new RFID component 100 by the detachable structure to form a new and complete cable lock.

The steps of connecting the RFID component 100 to the locator 200 by the detachable structure includes:

connecting the RFID component 100 to the locator 200 by a T-shaped docking structure;

providing an electric connection between the RFID component 100 and the locator 200 by a connector upon connecting the RFID component 100 and the locator 200;

providing an electric connection between the RFID component 100 and the locator 200 by a pogo pin interface and an electrically conductive sheet upon connecting the RFID component 100 and the locator 200;

limiting the RFID component 100 and the locator 200 by a position limit step upon connecting the RFID component 100 and the locator 200;

threading a metal cable of the cable lock though the RFID component 100 and the locator 200 successively after connecting the RFID component 100 and the locator 200;

triggering a power microswitch in the RFID component 100 by the metal cable passing though the locator 200; and threading the metal cable though a lock core in the locator 200 in a single direction and locking the metal cable by the lock core in an opposite direction.

Embodiment Two

On the basic of the EMBODIMENT ONE, a method for assembling an RFID component to a locator will be further described as follows.

As shown in FIG. 1, the cable lock with locator mainly includes two parts, i.e., a RFID component 100 which can be discarded after use, and a locator 200 which can be reused.

The RFID component 100 includes a metal cable 3 and a first lock body 1. The first lock body 1 preferably has a square upper housing 11.

The metal cable 3 is preferably a steel cable. Alternatively, the metal cable may be a cable of another metal material.

The locator 200 includes a second lock body 2. The second lock body 2 preferably has a square lower housing 21.

The first lock body 1 and the second lock body 2 respectively represent a part of the lock body, where the term "first" and "second" are only intended to distinguish different parts of the lock body, and are not intended to imply an order.

Figure 2:
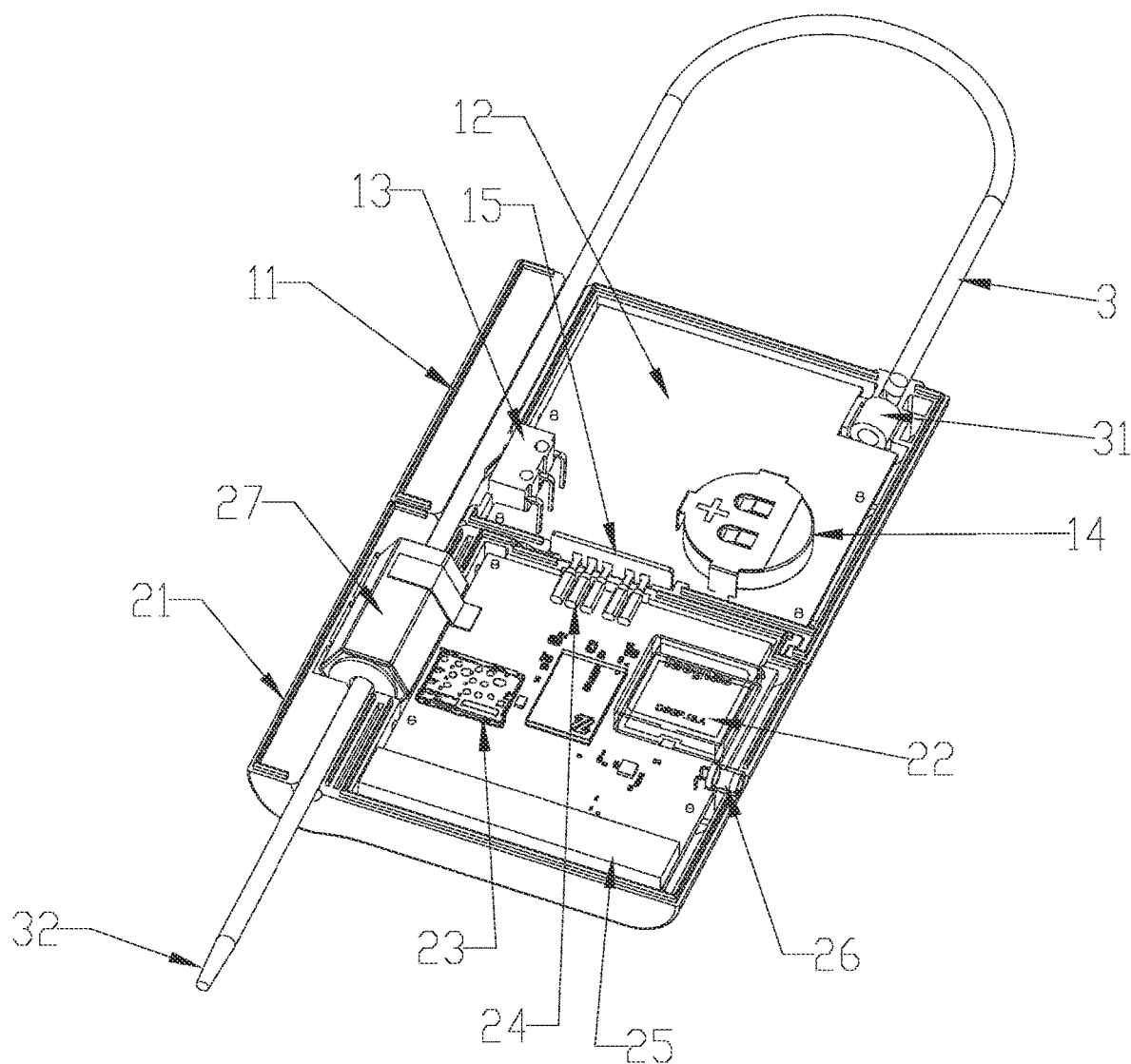
FIG. 2 depicts a schematic diagram showing the internal structure of a cable lock according to an embodiment of the disclosure.

As shown in FIG. 2, the first lock body 1 is provided with an RFID device 12. The second lock body 2 is provided with a locator 22. The first lock body 1 and the second lock body 2 can be integrated into one piece by a detachable structure.

The second lock body 2 is provided with a data transmitter 23 that is electrically connected with the locator 22. The real-time locating information of the locator 22 can be wirelessly transmitted to a remote terminal device through the data transmitter 23. For example, the locator 22 can transmit real-time locating information to a client or a background server through the data transmitter 23. The client can be a mobile phone or a handheld device of a user.

As shown in FIG. 3, the first lock body 1 and the second lock body 2 can be connected through a detachable structure.

Figure 4:
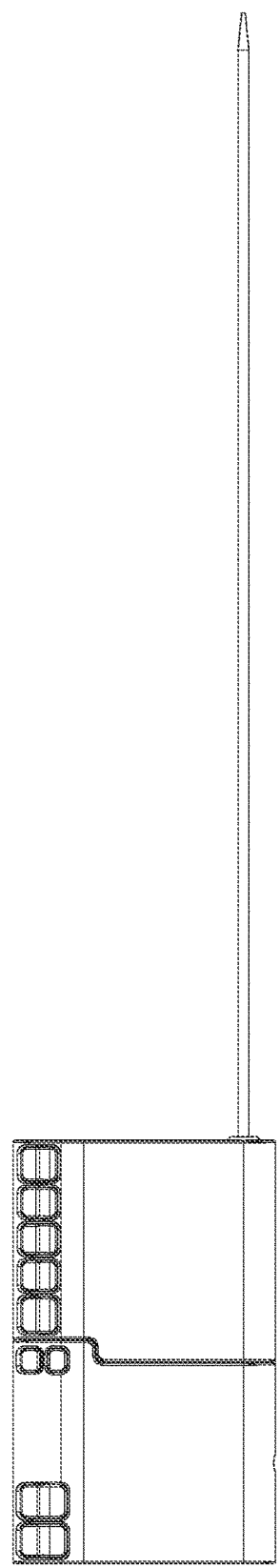
FIG. 4 depicts a schematic diagram showing the assembling process of a cable lock according to an embodiment of the disclosure.

As shown in FIG. 4, the first lock body 1 and the second lock body 2 are connected to form a cable lock with that is in an unlocked state.

Figure 5:
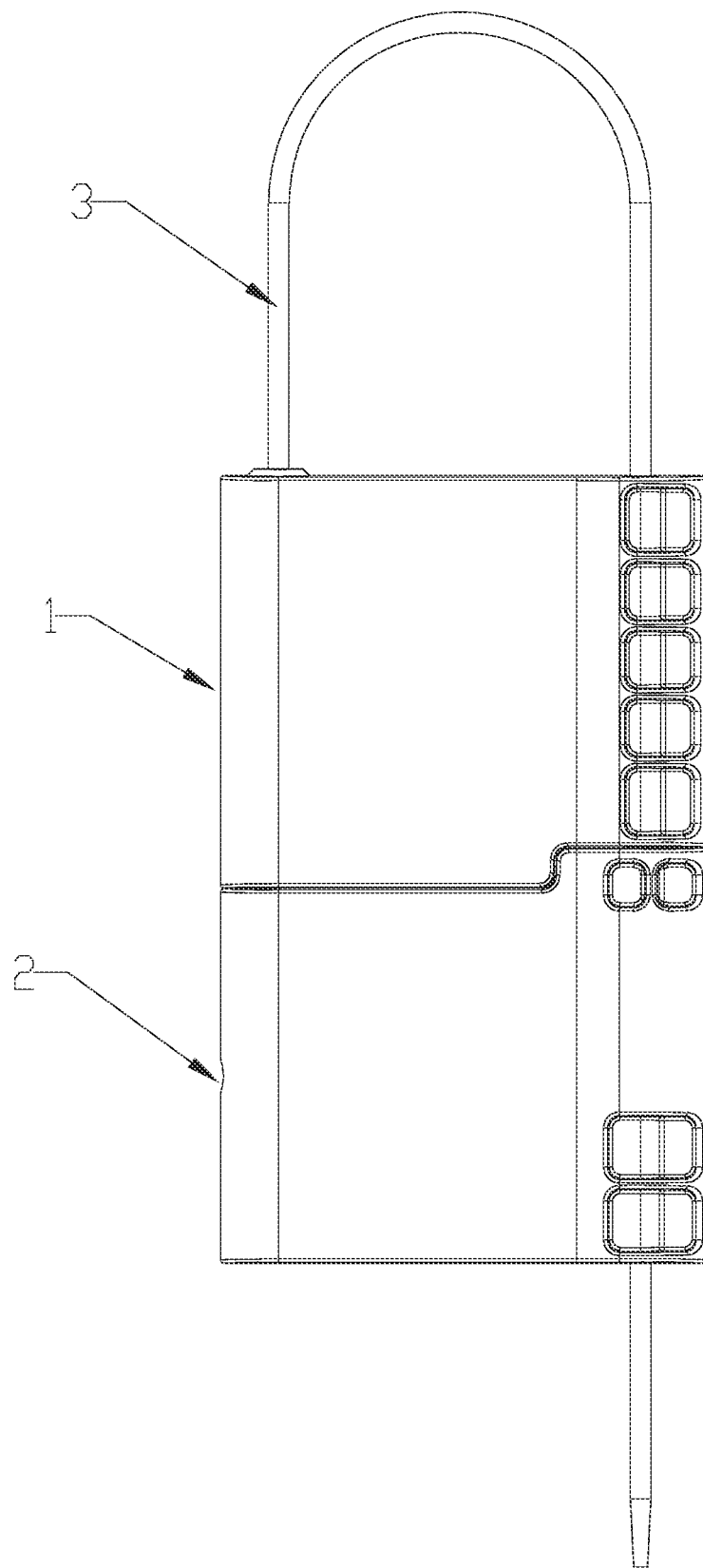
FIG. 5 depicts a schematic diagram showing the assembling process of a cable lock according to an embodiment of the disclosure.

As shown in FIG. 5, once the metal cable 3 passes through the first lock body 1 and then through the second lock body 2, the metal cable 3 can be locked thereby. Unlocking will not be possible unless the metal cable 3 is cut off.

Once the metal cable 3 is cut, the RFID component 100 is destroyed and can only be discarded. But the locator 200 is not destroyed, which can be assembled with a new RFID component 100 through a detachable structure to form a new cable lock with such that the locator 200 is recycled and reused. Thereby, the locating function of the cable lock is achieved while the cost is effectively controlled, such that the cost of the cable lock decreased, which is beneficial to the large-scale deployment of the cable lock.

The cable lock is locked on the container, such that the location information of the goods within the locked container is monitored in real time.

Embodiment Three

In this embodiment, the transmission of electrical signals between the RFID component 100 and the locator 200 of the cable lock is improved based on embodiment one.

As shown in FIG. 2, the RFID device 12 is electrically connected with the data transmitter 23, so that the information of the RFID device 12 can be transmitted through the data transmitter 23, and the status of the RFID device 12 can be known remotely.

The first lock body 1 is provided with a battery for supplying power to the RFID device 12, the locator 22 and the data transmitter 23. Since the first lock body 1 has more free space, mounting the battery in the first lock body 1 is more conducive to the rational use of space.

The battery is preferably a small button battery 14.

The battery can be a rechargeable battery or non-rechargeable battery.

The first lock body 1 is provided with a first connector. The second lock body 2 is provided with a second connector. When the first lock body 1 and the second lock body 2 are integrated into one piece, the first connector is communicatively connected with the second connector, thereby realizing the transmission of electric signals between the RFID component 100 and the locator 200.

The RFID device 12 is electrically connected with the first connector. The locator 22 and the data transmitter 23 are electrically connected with the second connector.

Figure 6:
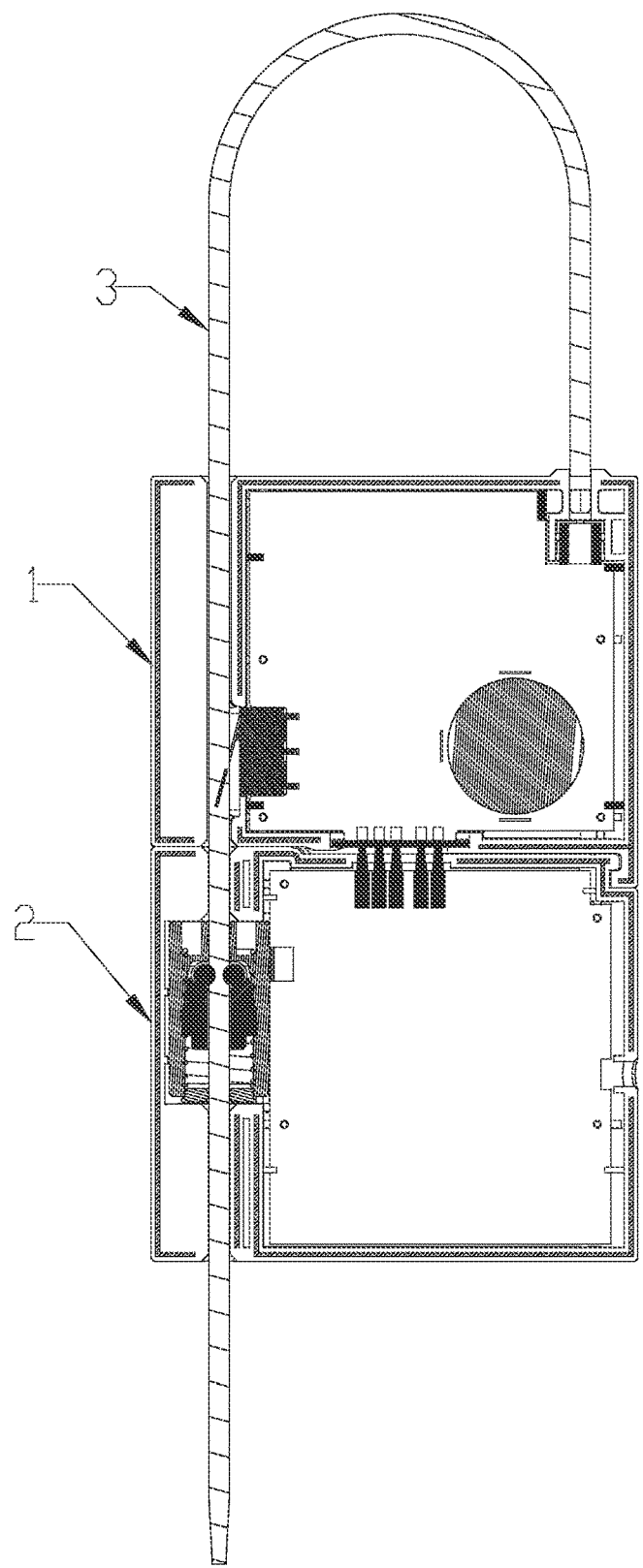
FIG. 6 depicts a schematic diagram showing the internal structure in a locked state of a cable lock according to an embodiment of the disclosure.
Figure 7:
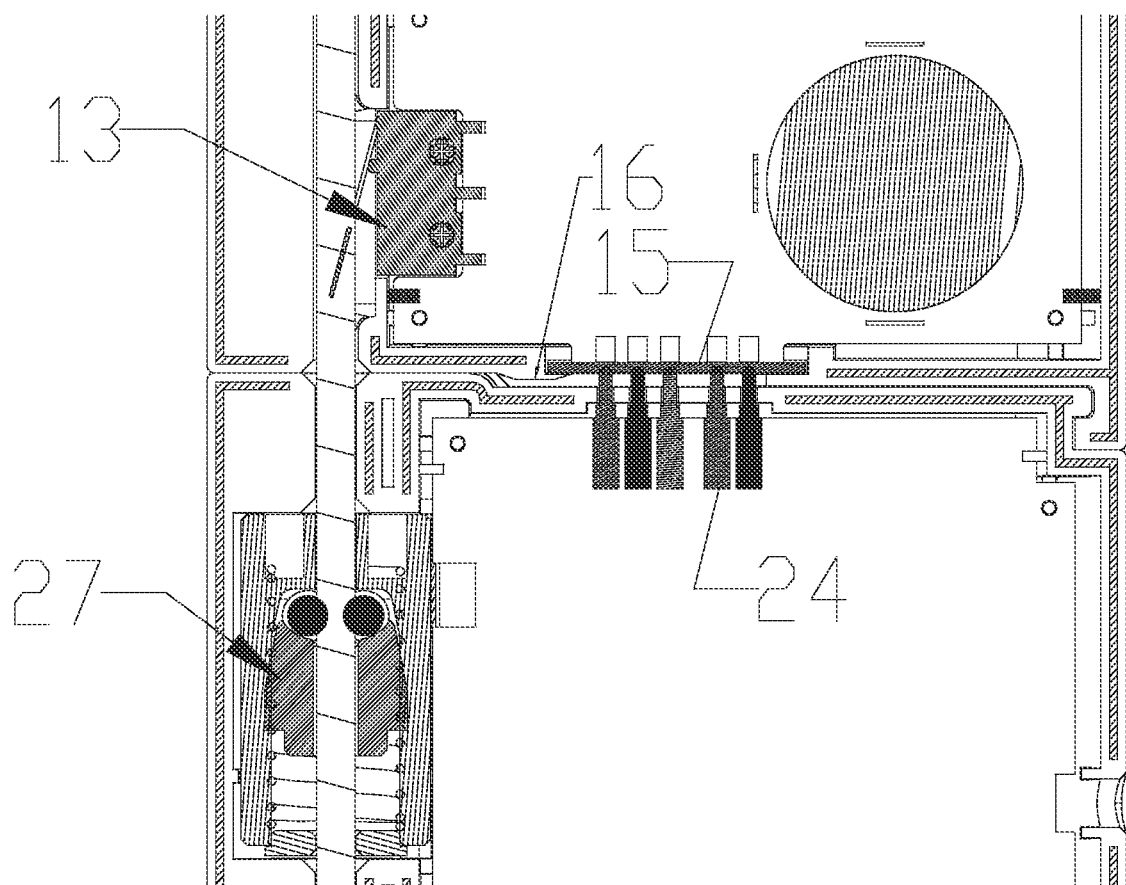
FIG. 7 depicts an enlarged schematic view showing a cable lock according to an embodiment of the disclosure.

As shown in FIGS. 6 and 7, the second connector is a pogo pin interface 24. The first connector is an electrically conductive sheet 15 which is in electrical connection and fits with the pogo pin interface 24. The first lock body 1 is provided with a guiding plate 16 which allows the pogo pin interface 24 to be released and compressed smoothly and flexibly. As the first lock body 1 and the second lock body 2 are connected through a detachable structure, the pogo pin interface 24 can slide in and electrically connect the electrically conductive sheet 15 with the help of the guiding plate 16. Thereby, the transmission of electrical signals between the RFID component 100 and the locator 200 is achieved, and battery and communication between the two devices can be achieved through the pogo pin interface.

The guiding plate 16 includes a guide-in slope for guiding the pogo pin interface 24 in and a guide-out slope for guiding the pogo pin interface 24 out.

The guiding plate 16 is preferably in the shape of an isosceles trapezoid.

The second lock body 2 is provided with an antenna 25 that is electrically connected with the data transmitter 23.

The second lock body 2 is provided with an indicator light 26 for state indication, such as the activation of the battery.

Embodiment Four

In this embodiment, the arrangement of the battery is modified based on embodiment two.

The position where the battery is mounted, is adjusted from the first lock body 1 to the second lock body 2. In such an arrangement, the battery directly supplies power to the locator 22 and the data transmitter 23, and then supplies power to the RFID device 12 through the connector.

Embodiment Five

The position of the connector is modified based on embodiment two.

A pogo pin interface is mounted on the first lock body 1. And an electrically conductive sheet is mounted on the second lock body 2.

Embodiment Six

In this embodiment, the locator 22 and the data transmitter 23 are selected on the basis of the embodiment one.

The locator 22 can be a Galileo device, a GPS device, a Beidou positioning system device, or another positioning system device.

The data transmitter 23 may be a GSM device, a GPRS device, or other wireless transmitters.

Embodiment Seven

In this embodiment, the detachable structure is illustrated in detail based on embodiment one.

Figure 8:
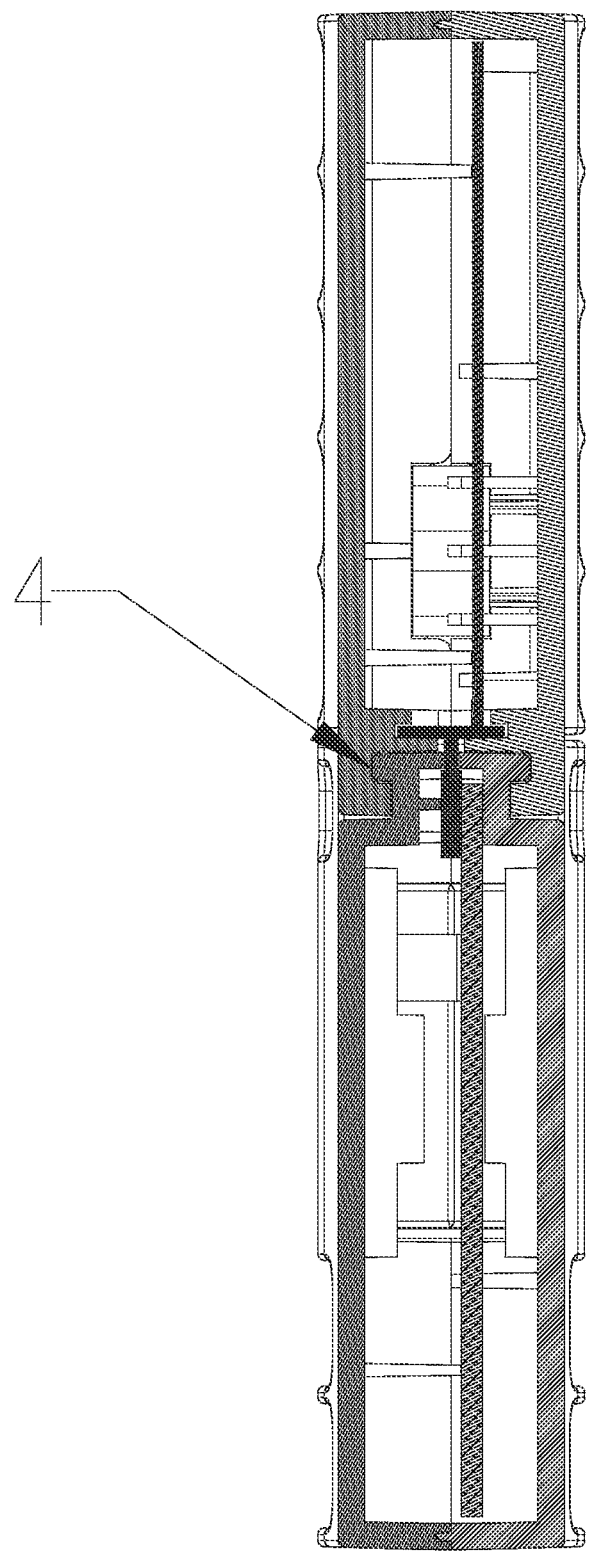
FIG. 8 depicts a schematic diagram showing a T-shaped docking structure of a cable lock according to an embodiment of the disclosure.
Figure 9:
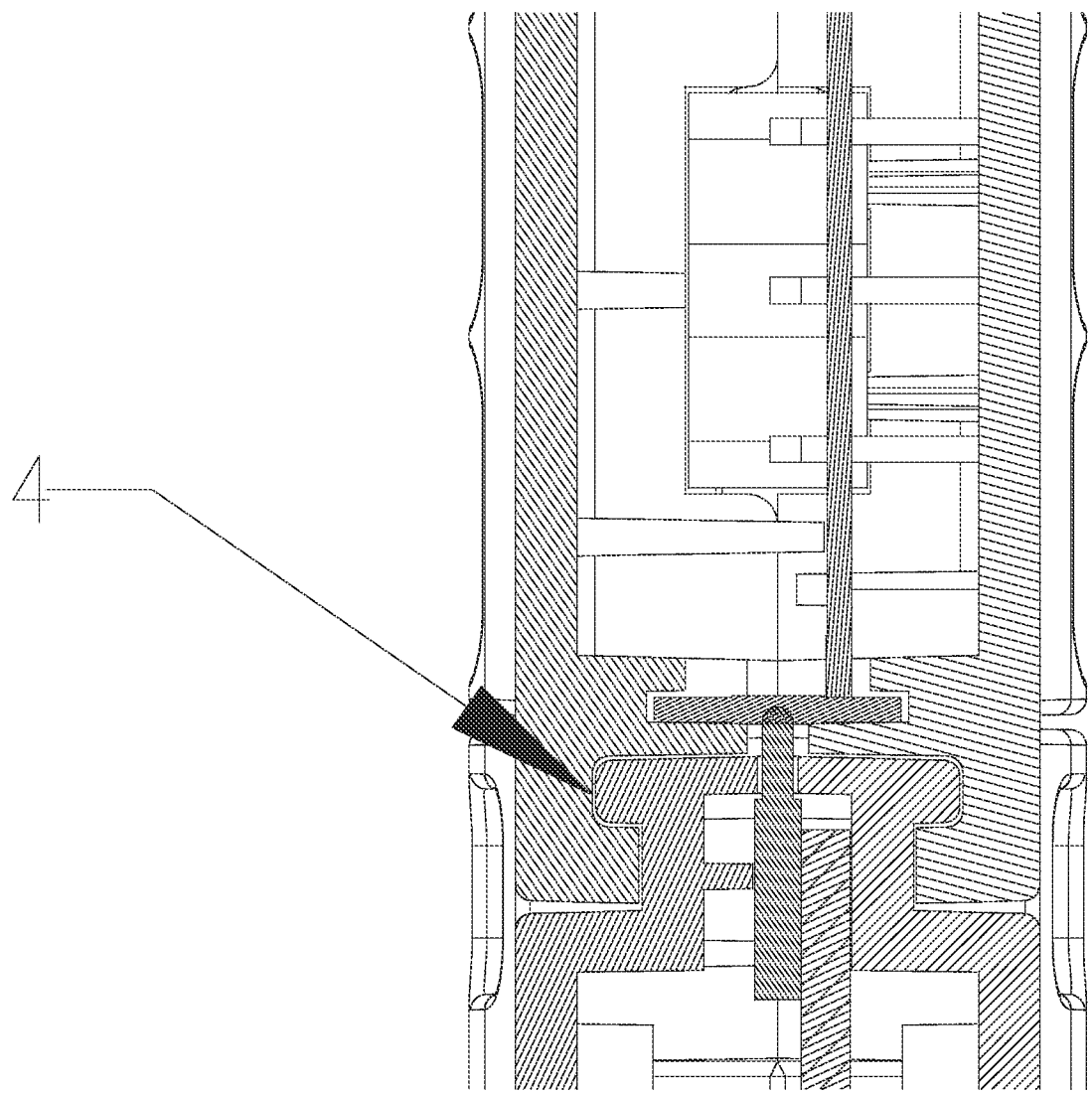
FIG. 9 depicts an enlarged schematic view showing the T-shaped docking structure of a cable lock according to an embodiment of the disclosure.

As shown in FIGS. 8 and 9, the detachable structure is a T-shaped docking structure 4, which can be matched with the metal cable 3 to form a stable upper and lower device.

Figure 10:
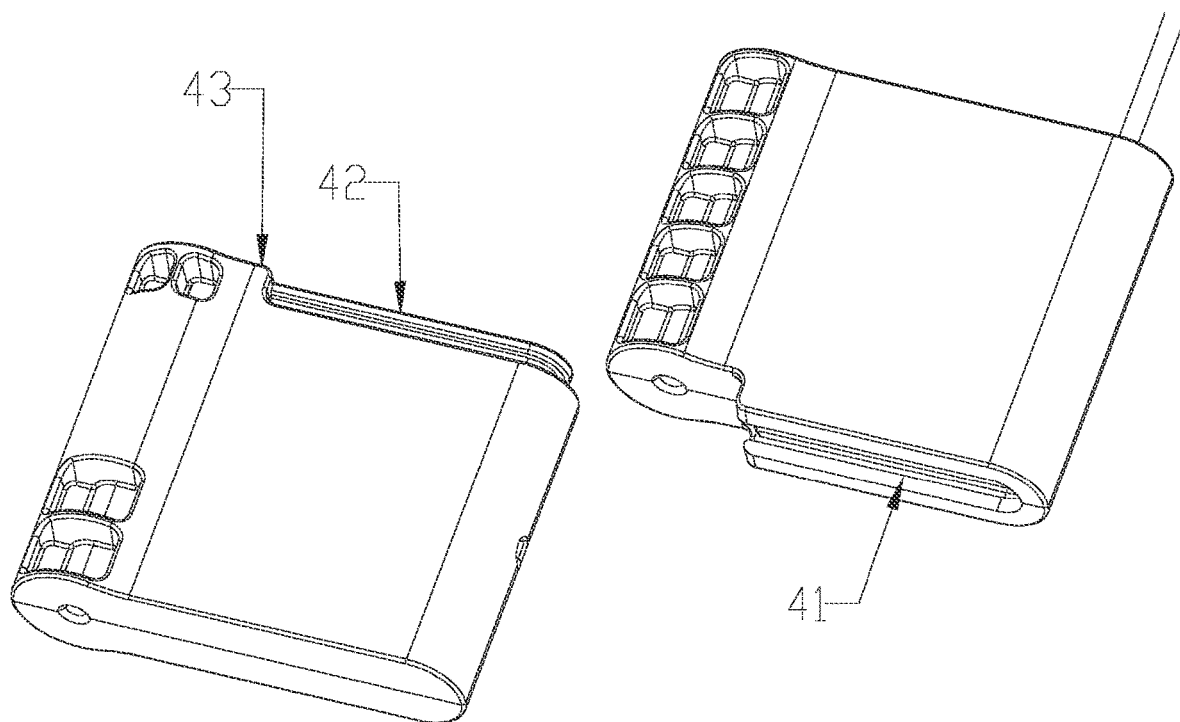
FIG. 10 depicts a docking schematic diagram showing a T-shaped docking structure of a cable lock according to an embodiment of the disclosure.
Figure 11:
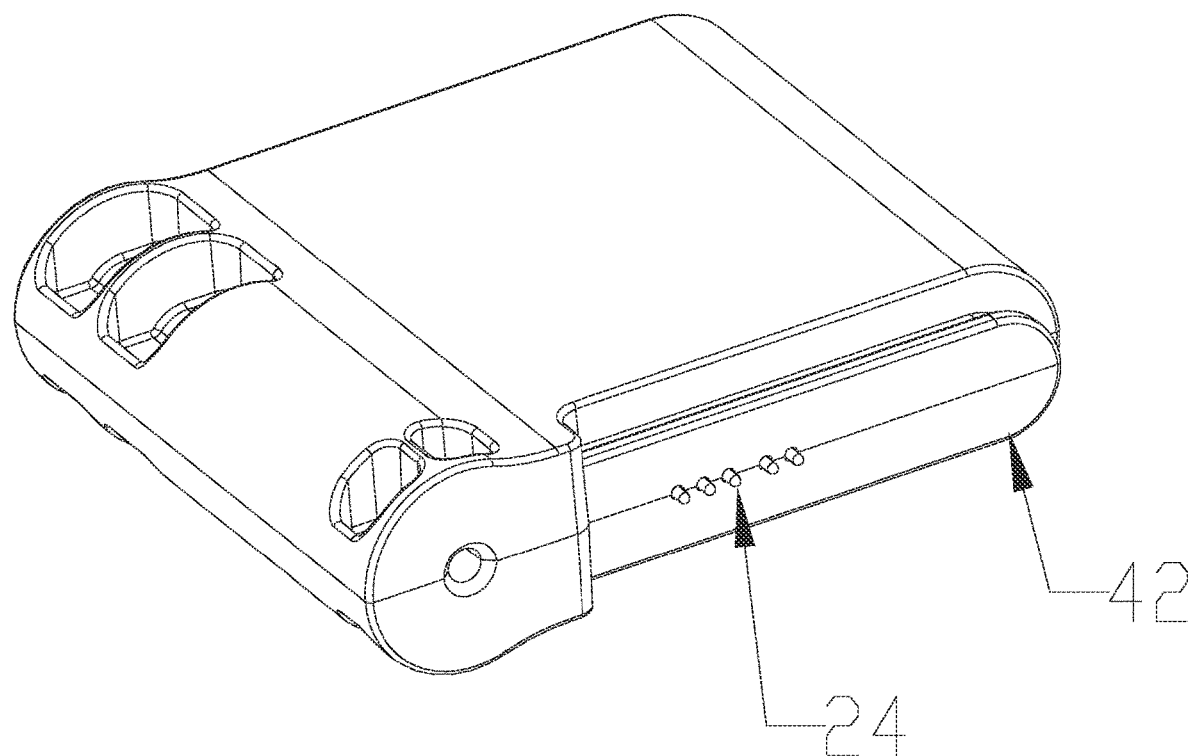
FIG. 11 depicts a schematic diagram showing a pogo pin interface of a cable lock according to an embodiment of the disclosure.

As shown in FIGS. 10 and 11, the T-shaped docking structure 4 includes a T-shaped guide rail 41, and a T-shaped slider 42 in sliding fits with the T-shaped guide rail 41.

The T-shaped guide rail 41 is arranged on the first lock body 1. The T-shaped slider 42 is arranged on the second lock body 2.

As shown in FIG. 11, the pogo pin interface 24 is mounted on the T-shaped docking structure 4. In particular, the pogo pin interface 24 can be mounted on the T-shaped slider 42, which can synchronously complete the docking of the connector when the lock body is docked.

As shown in FIG. 9, the T-shaped guide rail 41 is arranged above, the T-shaped slider 42 is arranged below, and the pogo pin interface 24 is mounted on the T-shaped slider 42, so that water can be prevented from entering the joint of the pin. That is, the T-shaped guide rail 41 acts as a waterproof wrap around the pogo pin interface 24, such that an enclosed space is thus formed. The pogo pin interface 24 is raised above the water inlet by the T-shaped slider 42. That is, the pogo pin interface 24 is mounted on a raised platform which is higher than the butt joint of the T-shaped guide rail 41 and the T-shaped slider 42. As such, when water flows from top to bottom, the water can enter the butt joint of the T-shaped guide rail 41 and the T-shaped slider 42 at most, but the water would not enter the space where the pogo pin interface 24 is located. Thereby, the rain-proof requirements of products are met.

The pogo pin interface 24 may also be mounted on the T-shaped guide rail 41.

As shown in FIG. 10, a position limit step 43 is provided at an end of the T-shaped slider 42 to limit the position where the first lock body 1 and the second lock body 2 are docked in position.

Embodiment Eight

In this embodiment, the positions of the T-shaped guide rail and the T-shaped slider are exchanged on the basis of embodiment six. Therefore, the T-shaped slider is arranged on the first lock body 1 and the T-shaped guide rail is arranged on the second lock body 2.

Embodiment Nine

The detachable structure is modified on the basis of embodiment six.

The guide rail of an alternative shape can be employed to cooperate with the slider to form a detachable structure.

A buckle structure can be employed to form a detachable structure. In an example, a structure of a male buckle mated with a female buckle is employed.

Alternatively, fasteners can be employed to form a detachable structure, such as screws and threaded holes, or screws and nuts.

Embodiment Ten

In this embodiment, the arrangement of the first lock body 1 and the second lock body 2 is further illustrated.

As shown in FIG. 3, the first lock body 1 and the second lock body 2 can be arranged in an up-and-down fashion. That is, the first lock body 1 is the upper lock body and the second lock body 2 is the lower lock body.

Alternatively, the first lock body and the second lock body can also be arranged in a left-and-right fashion.

The docking of the two locking bodies can be made along a horizontal direction (as shown in FIG. 3), a vertical direction, or an inclined direction.

Embodiment Eleven

This embodiment further illustrates how the cable lock is locked on the basis of the embodiment one.

As shown in FIGS. 2, 3 and 4, before locking, an end 31 of the metal cable 3 is fixed onto the first lock body 1, and the other end of the metal cable 3 is a free end 32.

As shown in FIGS. 2 and 5, after locking, the free end of the metal cable 3 is firmly locked on the second lock body 2.

The second lock body 2 is provided with a lock core 27. The free end 32 of the metal cable 3 can pass through the lock core 27 in a single direction, i.e., a first direction. As the metal cable 3 passes through the lock core 27, the lock core 27 firmly locks the metal cable 3 in a second direction opposite to the first direction. As such, unlocking would not be possible unless the metal cable 3 is cut off.

The first lock body 1 is provided with a power microswitch 13 for triggering the battery. The free end 32 of the metal cable 3 can pass through the first lock body 1. The power microswitch 13 is triggered when the metal cable 3 passes through the first lock body 1.

The free end 31 of the metal cable 3 passes through the first lock body 1 and then through the second lock body 2.

The first lock body 1 and the second lock body 2 are both provided with a through hole through which metal cable 3 passes.

Based on the above method for assembling an RFID component to a locator in a cable lock, the traditional one-piece lock body is divided into two parts, i.e., a disposable RFID component and a recyclable locator. After unlocking, the RFID component is discarded and the locator is recycled for subsequent assembling for a new cable lock with locator. The locating function of the cable lock can be realized due to the locator, so as to realize the real-time locating function of the locked container. On this basis, the locator can be recycled, which can realize the locating function without increasing the use cost as much as possible.

The above content is a further detailed description of some embodiments of the disclosure in conjunction with detailed embodiments, and it is not intended to limit the disclosure to these descriptions. For a person having ordinary skill in the art, various deductions or alterations can be made without departing from the concept of the disclosure, and these should be regarded as falling within the protection scope of the disclosure.

What is claimed is:

1. A method for assembling an RFID component to a locator in a cable lock, comprising:
connecting a disposable RFID component to a reusable locator by a detachable structure, threading a metal cable of the cable lock through the RFID component and the locator successively after connecting the RFID component to the locator by the detachable structure;

threading the metal cable through a lock core in the locator in a single direction and locking the metal cable by the lock core in an opposite direction.

2. The method according to claim 1, comprising:

removing the locator from an unlocking cable lock with a RFID component damaged;

discarding the RFID component; and connecting the locator to a new RFID component by the detachable structure.

3. The method according to claim 1, comprising connecting the RFID component to the locator by a T-shaped docking structure.

4. The method according to claim 1, comprising providing an electric connection between the RFID component and the locator by a connector upon connecting the RFID component to the locator by the detachable structure.

5. The method according to claim 4, comprising providing the electric connection between the RFID component and the locator by the pogo pin interface and the electrically conductive sheet upon connecting the RFID component to the locator by the detachable structure.

6. The method according to claim 1, comprising limiting the RFID component and the locator by a position limit step upon connecting the RFID component to the locator by the detachable structure.

7. The method according to claim 1, comprising triggering a power microswitch in the RFID component by the metal cable passing through the locator.

8. The method according to claim 1, wherein the cable lock is unlocked as the metal cable is cut after the metal cable is locked by the lock core in the opposite direction, and the RFID component is damaged.

9. The method according to claim 1, wherein the metal cable is a steel cable.

10. The method according to claim 1, wherein the RFID component comprises an RFID device and an RFID side lock body, and wherein the RFID side lock body is a portion of the complete body of the cable lock.

11. The method according to claim 10, wherein the RFID side lock body is provided with a docking structure which is a portion of the detachable structure.

12. The method according to claim 10, wherein the RFID side lock body is provided with a RFID side connector.

13. The method according to claim 1, wherein the locator comprises a location device, a data transmitter and a location side lock body, and wherein the location side lock body is a portion of the complete body of the cable lock.

14. The method according to claim 13, wherein the location side lock body is provided with a location side detachable portion which is a portion of the detachable structure.

15. The method according to claim 13, wherein the location side lock body is provided with a location side connector.

16. The method according to claim 13, wherein the location device is electrically connected to the data transmitter.

* * * * *